(12) United States Patent
Wang et al.

(10) Patent No.: US 11,251,633 B2
(45) Date of Patent: Feb. 15, 2022

(54) CHARGING CONNECTOR AND CHARGING APPARATUS

(71) Applicant: SZ DJI TECHNOLOGY CO., LTD., Shenzhen (CN)

(72) Inventors: Wei Wang, Shenzhen (CN); Jiangang Feng, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 233 days.

(21) Appl. No.: 16/717,026

(22) Filed: Dec. 17, 2019

(65) Prior Publication Data
US 2020/0127480 A1    Apr. 23, 2020

Related U.S. Application Data

(63) Continuation of application No. PCT/CN2017/104195, filed on Sep. 29, 2017.

(30) Foreign Application Priority Data

Jul. 19, 2017    (CN) .......................... 201720883267.9

(51) Int. Cl.
*H02J 7/00*    (2006.01)
*H01M 10/44*    (2006.01)
(Continued)

(52) U.S. Cl.
CPC ........... *H02J 7/0045* (2013.01); *H01M 10/44* (2013.01); *H01R 13/6205* (2013.01); *H01R 33/92* (2013.01); *H01M 2220/20* (2013.01)

(58) Field of Classification Search
CPC .. H02J 7/0045; H01M 10/44; H01M 2220/20; H01R 13/6205; H01R 33/92
(Continued)

(56) References Cited

U.S. PATENT DOCUMENTS

2011/0018360 A1    1/2011    Baarman et al.
2015/0263547 A1    9/2015    Browne
(Continued)

FOREIGN PATENT DOCUMENTS

CN    2752977 Y    1/2006
CN    105429195 A    3/2016
(Continued)

OTHER PUBLICATIONS

The World Intellectual Property Organization (WIPO) International Search Report for PCT/CN2017/104195 dated Nov. 30, 2017 7 pages.

*Primary Examiner* — Suresh Memula
(74) *Attorney, Agent, or Firm* — Anova Law Group, PLLC (57) ABSTRACT

Charging connector and charging apparatus are provided. The charging connector includes a partition plate including at least one charging interface provided on each side surface of two opposite side surfaces of the partition plate. The at least one charging interface is electrically coupled to a charging interface of a battery to charge the battery. Two lateral plates are respectively pivotally connected to the two opposite side surfaces of the partition plate and respectively rotatable with respect to the partition plate. Outer edges of the two lateral plates, which are away from a pivot joint portion, are configured to move away from or close to the partition plate to expose or cover the two opposite side surfaces of the partition plate to enable the charging connector to be in an open state or a folded state correspondingly.

18 Claims, 5 Drawing Sheets

(51) Int. Cl.
*H01R 13/62* (2006.01)
*H01R 33/92* (2006.01)

(58) Field of Classification Search
USPC .......................................................... 320/107
See application file for complete search history.

(56) References Cited

U.S. PATENT DOCUMENTS

| | | | |
|---|---|---|---|
| 2016/0039541 A1* | 2/2016 | Beardsley | B64C 39/024 |
| | | | 701/2 |
| 2018/0086453 A1* | 3/2018 | Scott-Nash | G06Q 10/06316 |
| 2019/0036350 A1* | 1/2019 | Gleason | H01M 10/6563 |
| 2019/0199101 A1* | 6/2019 | Hennesy | H02J 7/0013 |
| 2020/0207230 A1* | 7/2020 | Evans | B60L 53/66 |
| 2021/0075235 A1* | 3/2021 | Nook | H01M 10/4207 |
| 2021/0138921 A1* | 5/2021 | Fox | B60L 58/10 |

FOREIGN PATENT DOCUMENTS

| | | | | |
|---|---|---|---|---|
| CN | 106130113 A | | 11/2016 | |
| CN | 205829237 U | | 12/2016 | |
| CN | 205846795 U | | 12/2016 | |
| CN | 205960716 U | | 2/2017 | |
| CN | 206983762 U | * | 2/2018 | ............ H02J 7/0013 |
| JP | S60192634 U | | 12/1985 | |
| JP | H03040763 U | | 4/1991 | |
| JP | H03086745 U | | 9/1991 | |
| KR | 20170068153 A | * | 6/2017 | |
| WO | 2017029611 A1 | | 2/2017 | |
| WO | WO-2019061519 A1 | * | 4/2019 | ............ B60L 53/14 |
| WO | WO-2020000699 A1 | * | 1/2020 | ............ H01R 13/72 |

* cited by examiner

CHARGING CONNECTOR AND CHARGING APPARATUS

CROSS-REFERENCE TO RELATED APPLICATION

This application is a continuation of International Application No. PCT/CN2017/104195, filed Sep. 29, 2017, which claims priority to Chinese Application No. 201720883267.9, filed Jul. 19, 2017, the entire content of all of which is incorporated herein by reference.

TECHNICAL FIELD

The present disclosure relates to the charging field, and more particularly, to a charging connector and a charging apparatus.

BACKGROUND

Batteries are indispensable components for various types of portable terminals and tools, including unmanned aerial vehicles. With the rapid development and high popularity of unmanned aerial vehicles, battery life is becoming more and more important. Battery capacity, however, is still in the bottleneck and difficult to break through. Therefore, much efforts have been focused on the charging techniques, such as, the charging speed and the charging apparatus, to provide convenience for charging the batteries. Generally, in order to ensure the endurance of an unmanned aerial vehicle, a charging apparatus needs to be carried around.

When multiple batteries need to be charged at the same time, a charger with multiple charging interfaces is required. Chargers currently available on the market for charging multiple batteries of the unmanned aerial vehicles often take a form of flat panel with multiple charging interfaces arranged side by side. Such chargers not only take up a large space and are hard to carry, but also are unaesthetic and have a low utilization rate.

SUMMARY

The present disclosure provides a charging connector. The charging connector includes a partition plate including at least one charging interface provided on each side surface of two opposite side surfaces of the partition plate. The at least one charging interface is electrically coupled to a charging interface of a battery to charge the battery. Two lateral plates are respectively pivotally connected to the two opposite side surfaces of the partition plate and respectively rotatable with respect to the partition plate. Outer edges of the two lateral plates, which are away from a pivot joint portion, are configured to move away from or close to the partition plate to expose or cover the two opposite side surfaces of the partition plate to enable the charging connector to be in an open state or a folded state correspondingly. When the battery being charged by the charging connector, at least one lateral plate of the two lateral plates is rotated with respect to the partition plate, whereby an outer edge of the at least one lateral plate is away from the partition plate to expose the at least one charging interface on at least one side surface of the two opposite side surfaces of the partition plate, to allow the exposed at least one charging interface to charge the battery.

The present disclosure also provides a charging apparatus for charging a battery of an unmanned aerial vehicle. The charging apparatus includes a charging connector. The charging connector includes a partition plate including at least one charging interface provided on each side surface of two opposite side surfaces of the partition plate. The at least one charging interface is electrically coupled to a charging interface of a battery to charge the battery. Two lateral plates are respectively pivotally connected to the two opposite side surfaces of the partition plate and respectively rotatable with respect to the partition plate. Outer edges of the two lateral plates, which are away from a pivot joint portion, are configured to move away from or close to the partition plate to expose or cover the two opposite side surfaces of the partition plate to enable the charging connector to be in an open state or a folded state correspondingly. When the battery being charged by the charging connector, at least one lateral plate of the two lateral plates is rotated with respect to the partition plate, whereby an outer edge of the at least one lateral plate is away from the partition plate to expose the at least one charging interface on at least one side surface of the two opposite side surfaces of the partition plate, to allow the exposed at least one charging interface to charge the battery.

DETAILED DESCRIPTION OF THE EMBODIMENTS

The present disclosure provides a charging connector and a charging apparatus, with effectively reduced, occupied space. The charging connector and charging apparatus are easy to carry.

Figure 1:
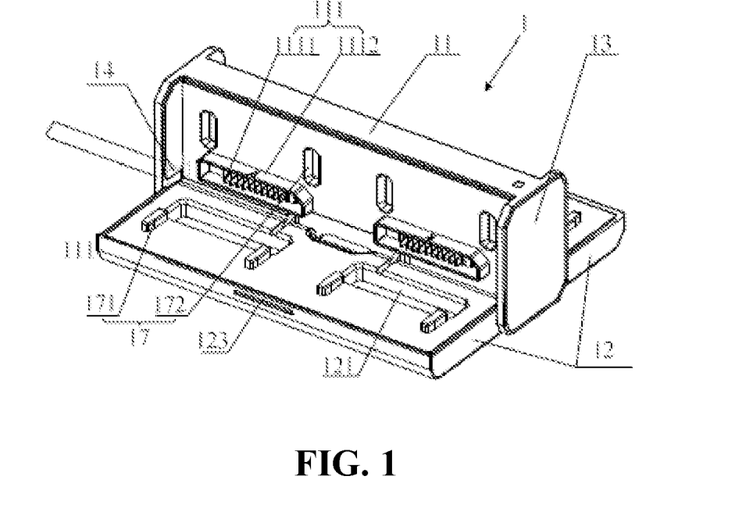
FIG. 1 is a schematic structural diagram of a charging connector in an open state according to an example embodiment of the present disclosure.
Figure 7:
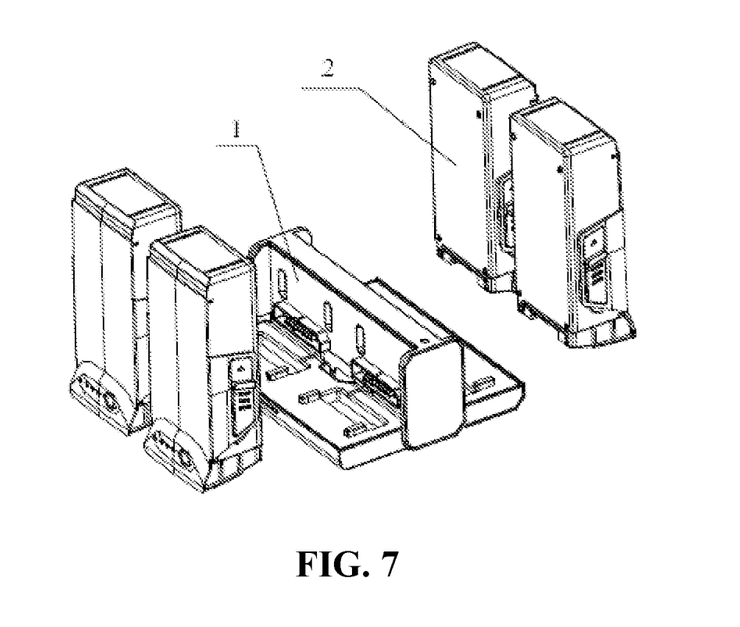
FIG. 7 is a schematic structural diagram of a charging connector and a battery according to an example embodiment of the present disclosure.

Referring to FIG. 1 and FIG. 7, in an example embodiment of the present disclosure, a charging connector 1 includes a partition plate 11 and two lateral plates 12. At least one charging interface 111 is provided on each side surface of the two opposite side surfaces of the partition plate 11. The at least one charging interface 111 is configured to electrically couple to a charging interface of a battery 2 to charge the battery 2. The two lateral plates 12 are each pivotally connected to a corresponding side surface of the two opposite side surfaces of the partition plate 11 whereby the two lateral plates 12 can be respectively rotated with respect to the partition plate 11. Thereby, the outer edges of the two lateral plates 12, which are away from the pivot joint portion, can be configured to be away or close to the partition plate 11 to expose or cover corresponding sides of the partition plate 11, the charging connector 1 is set in an open state or a folded state accordingly.

When the battery 2 being charged by the charging connector 1, at least one lateral plate 12 is rotated with respect to the partition plate 11 such that the outer edge of the at least one lateral plate 12 is moved away from the partition plate 11 to expose the at least one charging interface 111 provided on one corresponding side surface of the two opposite side surfaces of the partition plate 11. The exposed at least one charging interface 111 is enabled to charge the battery 2.

In one embodiment, the charging connector 1 can charge the battery 2 by supplying power to the at least one charging interface 111 through built-in batteries, or through an external power source.

Optionally, a quantity of 1-50 charging interfaces 111 are provided on each side surface of the two opposite side surfaces of the partition plate 11. Optionally, a quantity of 4-30 charging interfaces 111 are provided on each side surface of the two opposite side surfaces of the partition plate 11. Optionally, a quantity of 6-20 charging interfaces 111 are provided on each side surface of the two opposite side surfaces of the partition plate 11. Optionally, the quantity of charging interfaces 111 on one side surface of the two opposite side surfaces of the partition plate 11 can be the same as or different than the quantity of charging interfaces 111 on the other side surface of the two opposite side surfaces of the partition plate 11. Optionally, all the charging interfaces 111 on the partition plates 11 are independent from each other and do not affect each other. Obviously, all the charging interfaces 111 on the partition plates 11 can also be configured not to be independent from each other.

By disposing the charging interfaces 111 on the partition plate 11 and pivotally connecting the two lateral plates 12 to both sides of the partition plate 11, the two lateral plates 12 can be rotated with respect to the partition plate 11, whereby the charging connector 1 can be configured to be in an open state when charging the battery 2 and in a folded state when not charging the battery 2. This can effectively reduce the size of the charging connector 1 and allow a compact structure of the charging connector 1. The charging connector 1 is also easy to carry around. This can solve the problems associated with the existing flat panel chargers, which occupy a large space, are inconvenient to carry and store, and so on. In addition, the charging connector 1 can charge multiple batteries simultaneously and is easy to use, meeting the demand for endurance of an unmanned aerial vehicle.

Referring to FIG. 1, optionally, the charging connector 1 further includes two end plates 13. The two end plates 13 are respectively disposed at two ends of the partition plate 11. The width of the two end plates 13 is greater than the width of the two ends of the partition plate 11 (also referred to as the thickness of the partition plate 11), such that when the lateral plates 12 cover the partition plate 11, receiving spaces are formed between the lateral plates 12, the partition plate 11, and the two end plates 13 to accommodate the charging interfaces 111 disposed on the two opposite side surfaces of the partition plate 11. That is, one receiving space is formed between one corresponding lateral plate of the two lateral plates 12, the partition plates 11, and the two end plates 13.

Accordingly, two receiving spaces are respectively formed at the two opposite side surfaces of the partition plate 11 to respectively accommodate the charging interfaces 111 disposed on the two opposite side surfaces of the partition plate 11. Optionally, the outer edges of the two lateral plates 12, which are away from the pivot joint portion, are each transitionally curved or bent with respect to the main body of the corresponding lateral plate 12. As such, when the lateral plates 12 cover the partition panel 11, the outer edges of the two lateral plates 12, which are away from the pivot joint portion, are able to contact or approach the lateral plates 12 to form receiving spaces.

In one embodiment, the width of the two end plates 13 refers to a length of the two end plates 13 in the direction perpendicular to the two opposite side surfaces of the partition plate 11. The width of the two ends of the partition plate 11 refers to a width of the two end surfaces of the partition plate 11 in the direction perpendicular to the two opposite side surfaces of the partition plate 11, which is also referred to as a thickness of the partition plate 11.

Figure 3:
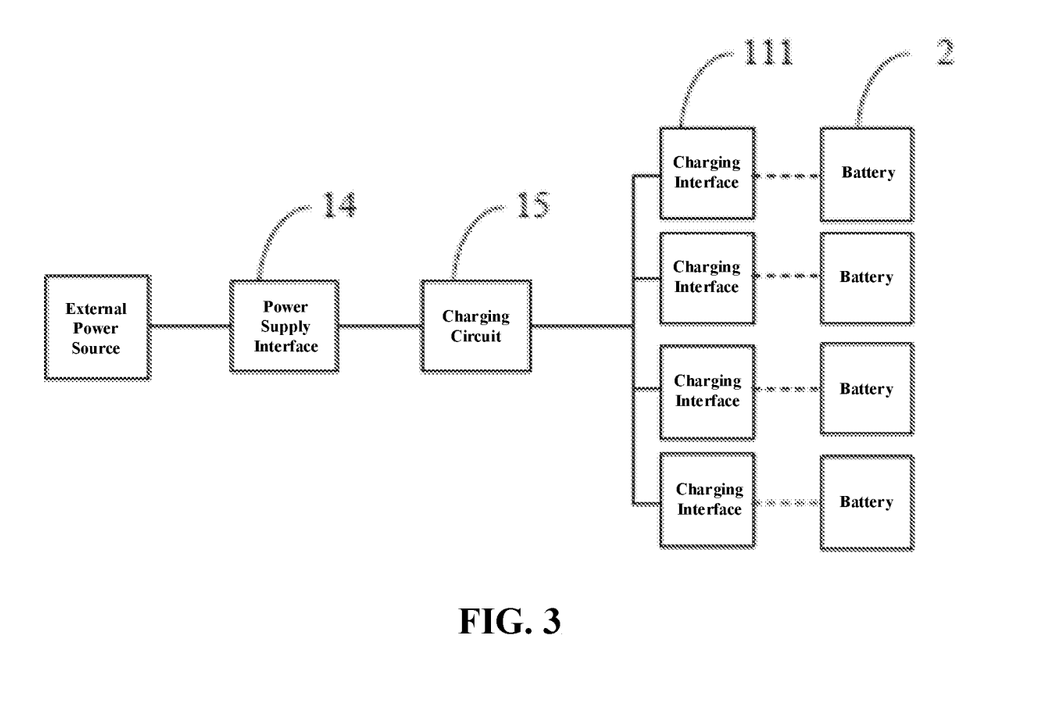
FIG. 3 is a schematic circuit diagram of a charging connector according to an example embodiment of the present disclosure.

Referring to FIGS. 1 and 3, optionally, the charging connector 1 further includes a power supply interface 14. The power supply interface 14 can be arranged on either one end plate of the end plates 13. The power supply interface 14 is electrically coupled to an external power supply. Further the power supply interface 14 is electrically coupled to the charging interfaces 111 so that the charging connector 1 can charge the batteries 2 through the exposed charging interfaces 111. In one embodiment, the partition plate 11 is configured to have a thickness, such that the connection wires or circuit board between the power supply interface 14 and the charging interfaces 111 can be disposed in the plate body of the partition plate 11. For example, a space may be created inside the partition plate 11, or the partition plate 11 may be made of a hollow plate for accommodate components such as wiring and circuit boards. In one embodiment, the charging interfaces 111 can be connected to the power supply interface 14 through the wires that lead out of the end plates 13. For example, the power supply interface 14 can be a power plug for inserting into a power strip to connect to the power supply. In addition, the power supply interface 14 can be an electrical interface provided on the end plates 13, such as a USB interface or other types of electrical interfaces, which may need corresponding external wires to connect the electrical interface to a power supply. The corresponding external wires can be detachably connected to the power supply interface 14, for example, a connecting charging plug.

Referring to FIGS. 1 and 3, optionally, the charging connector 1 further includes a charging circuit 15. The charging circuit 15 is provided in the plate body of the partition plate 11. The power supply interface 14 is electrically coupled through the charging circuit 15 to the charging interfaces 111 on the two opposite side surfaces of the partition plate 11. Optionally, the charging circuit 15 can include one or more of an overvoltage protection circuit, an overcurrent protection circuit, an overcharge protection circuit, etc., which can prevent from damaging the battery 2 due to overvoltage, overcurrent, or overcharging when the battery 2 is being charged.

Referring to FIG. 1, optionally, a plurality of charging interfaces 111 are respectively provided on the two opposite side surfaces of the partition plate 11. The plurality of charging interfaces 111 on each side surface of the two opposite side surfaces of the partition plate 11 are arranged side by side at intervals along the length of the partition plate 11.

Further, the plurality of charging interfaces 111 on one side surface of the two opposite side surfaces of the partition plate may be respectively symmetrically or alternately provided with respect to the plurality of charging interfaces 111 on the other side surface of the two opposite side surfaces of the partition plate 11.

Optionally, the charging interfaces 111 may be different types of charging interfaces 111, respectively, for example, a charging interface suitable for a mobile phone battery, a charging interface suitable for an unmanned aerial vehicle battery, a charging interface suitable for a camera battery, and so forth. The charging connector 1 can be configured to charge a variety of batteries. The charging connector 1 can also be configured to charge a single type of battery. In one embodiment, all the charging interfaces 111 can be an unified type of charging interface, for example, charging interfaces suitable for the battery 2 of unmanned aerial vehicle.

Figure 2:
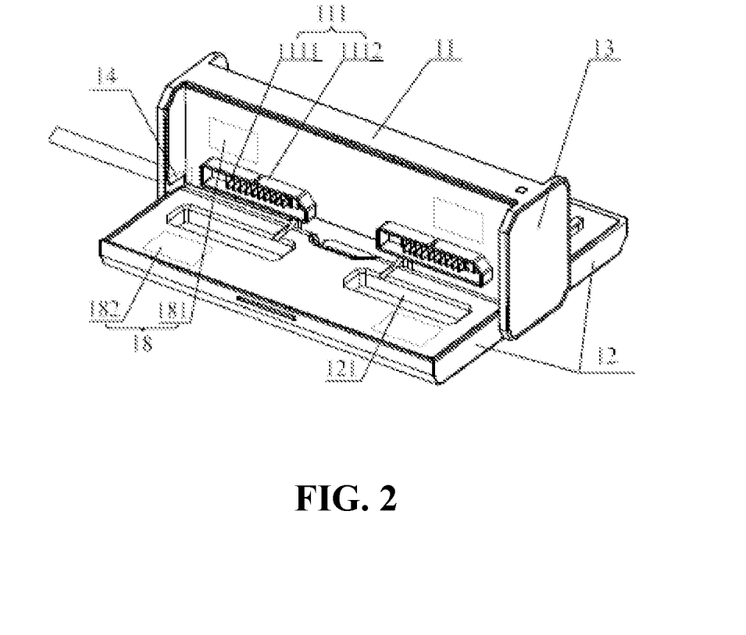
FIG. 2 is a schematic structural diagram of a charging connector in an open state according to another example embodiment of the present disclosure.

Referring to FIGS. 1 and 2, optionally, each charging interface 111 can include multiple parallelly arranged electrode sheets 1111 and an electrode ring member 1112. The electrode ring member 1112 is configured to protrude from one corresponding side surface of the two opposite side surfaces of the partition plate 11, and the multiple parallelly arranged electrode sheets 1111 are provided on the one corresponding side of the partition plate 11 encompassed by the electrode ring member 1112. When charging the battery 2, the charging interface of battery 2 is inserted into the electrode ring member 1112 and is in contact with the multiple parallelly arranged electrode sheets 1111. The electrode ring member 1112 is provided in such a way that when charging the battery 2, the electrode ring member 1112 is able to cover the contact area between the charging interface of battery 2 and the multiple parallelly arranged electrode sheets 1111 to prevent safety risks due to exposure of the contact area.

Referring to FIG. 1, optionally, a recess 121 is provided for each charging interface 111 on the lateral plate 12 corresponding to each charging interface 111. When the two lateral plates 12 cover the partition plate 11, each charging interface 111 is received in a corresponding recess 121. That is, the electrode ring member 1112 and the corresponding electrode sheet 1111 altogether are received in the corresponding recess 121. This can further save space and reduce the size of the charging connector 1.

Figure 4:
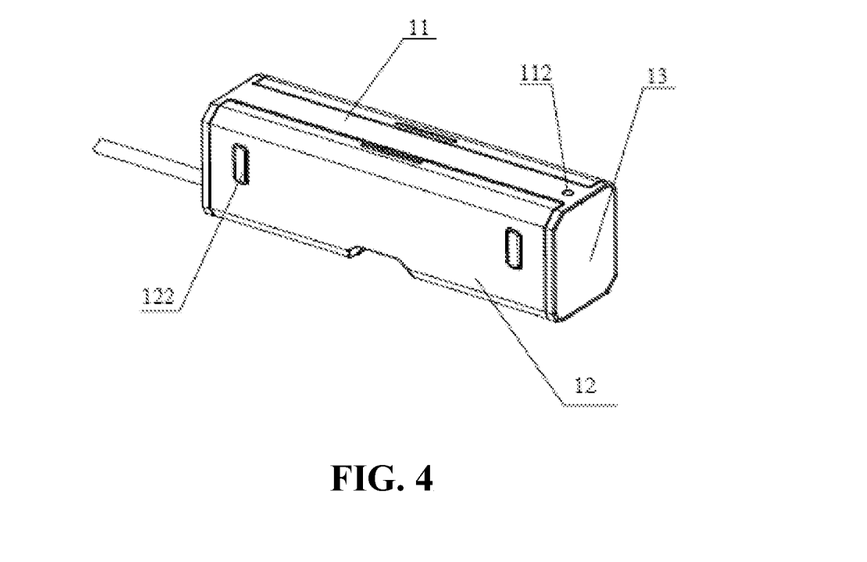
FIG. 4 is a schematic structural diagram of a charging connector in a folded state according to an example embodiment of the present disclosure.

Referring to FIG. 4, optionally, one or more protrusion 122 is provided on an outer surface of each lateral plate of the two lateral plate 12. The one or more protrusion 122 may be configured to be away from the partition plate 11. That is, the one or more protrusion 122 protrudes from the outer surface of the lateral plate 12. The one or more protrusion 122 is configured to support the corresponding lateral plate 12 when the charging connector 1 is set in the open state. This allows the lateral plates 12 to be held level or substantially level when the lateral plates 12 are open, which facilitates stabilizing the battery 2 during charging. Optionally, a plastic pad is wrapped on the outside of the protrusion 122.

Figure 5:
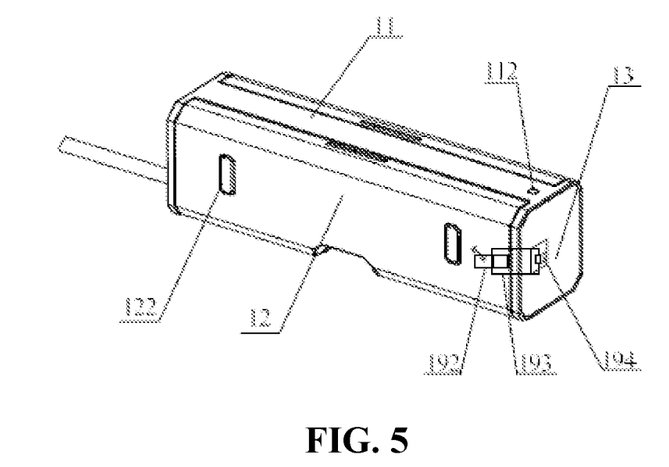
FIG. 5 is a schematic structural diagram of a charging connector in a folded state according to another example embodiment of the present disclosure.

Referring to FIGS. 1, 2, and 5, optionally, the charging connector 1 further includes at least on set of securing assembly. The at least one securing assembly is configured to secure the lateral plate 12 to the partition plate 11 when the lateral plate 12 is closed.

Referring to FIG. 1, optionally, the at least one securing assembly is a first snapping assembly 17, which includes a snap member 171 and a snap slot 172. The snap slot 172 is recessed in a side surface of either the partition plate 11 or the lateral plate 12, while the snap member 171 is protrudingly provided on a corresponding side surface of either the partition plate 11 or the lateral plate 12. When the lateral plate 12 is closed, the snap member 171 is snapped into the snap slot 172 whereby the lateral plate 12 is secured to the partition plate 11. Optionally, the at least one securing assembly further includes a switch, which is located on the other side surface of the lateral plate 12 that is a side surface opposite to the partition plate 11. When the lateral plate 12 is opened, the switch is configured to release the snap member 171 from the snap slot 172. Obviously, the switch may not be included. In some embodiments, a non-slip component 123 may be provided on the top of the lateral plate 12. A pulling force can be exerted by, for example, a finger, to the lateral plate 12 by means of the non-slip part 123 to release the snap member 171 from the snap slot 172.

Further, each charging interface 111 may correspond to two snap members 171. The distance between the two snap members 171 is in align with the width between the two sides of battery 2 when the battery 2 is being charged, such that the battery can be positioned between the two snap members 171. This enables the battery 2 to precisely mate with the charging interface, that is, the snap member 171 can be configured to perform a guiding function when the battery 2 is being charged.

Referring to FIG. 2, optionally, the at least one securing assembly may be a magnetic assembly 18, which includes a first magnetic member 181 and a second magnetic member 182. The first magnetic member 181 is disposed on the partition plate 11, while the second magnetic member 182 is disposed on one corresponding lateral plate of the two lateral plates 12. When the corresponding lateral plate 12 is closed, the first magnetic member 181 and the second magnetic member 182 are attracted to each other to secure the corresponding lateral plate 12 to the partition plate 11. For example, the first magnetic member 181 may be disposed in the plate body of the partition plate 11. One first magnetic member 181 may be configured to correspond to two second magnetic members 182 which are respectively provided on the two lateral plates 12. In some embodiments, a first magnetic member 181 may be provided on each side surface of the partition plate 11, and the first magnetic member 181 may correspond to a second magnetic piece 182 provided on a corresponding lateral plate 12.

Referring to FIG. 5, optionally, the at least one securing assembly may also be a locking assembly 19 including a hook member 191, a pressing member 192 and a ring-shaped restricting member 193. One end of the pressing member 192 is pivotally connected to the outer surface of the lateral plate 12, and the other end of the pressing member 192 can be fixed onto or released from the lateral plate 12 by rotating relative to the outer surface of the lateral plate 12. The pressing member 192 is rotatably connected to one end of the ring-shaped restricting member 193 to move the ring-shaped restricting member 193 during the rotation of the pressing member 192. The hook member 191 is configured to be disposed on the end plate 13. When the lateral plate 12 is closed, the other end of the ring-shaped restricting 193 holds the hook member 191, the other end of the pressing part 192 is pressed down to pull the ring-shaped restricting member 193, and the ring-shaped restricting member 193 and the hook member 191 are fixedly connected to each other. obviously, the hook member 191, the pressing member 192 and the ring-shaped restricting member 193 may be positioned differently with respect to one another.

Figure 6:
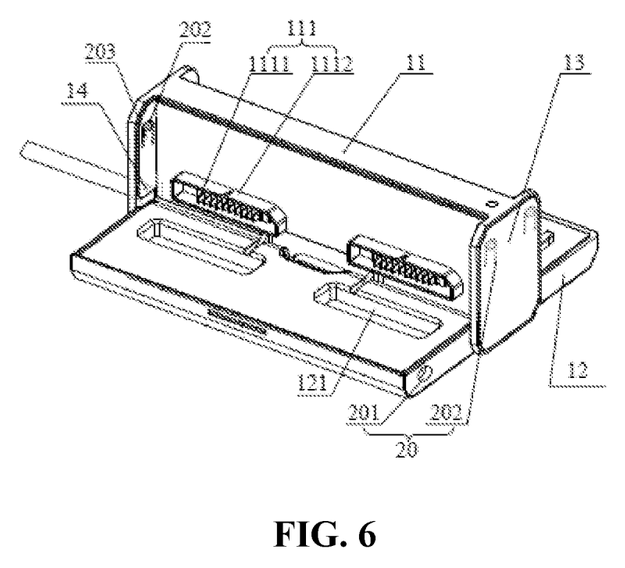
FIG. 6 is a schematic structural diagram of a charging connector in an open state according to yet another example embodiment of the present disclosure.

Referring to FIG. 6, optionally, the at least one securing assembly may also be a second snapping assembly 20. The second snapping assembly 20 includes a recessed member 201 and an elastic protruding member 202. The recessed member 201 may be configured to be provided at each end of each lateral plate 12. The elastic protruding members 202 are respectively disposed on the opposite side surfaces of the two end plates 13. Each end plate 13 is provided two elastic protruding members 202, which are respectively positioned on the two opposite side surfaces of the partition plate 11. That is, each end plate is provided with two elastic protruding members 202, each of which is located on one side of the partition plate 11. When the lateral plate 12 is closed, the elastic protruding members 202 are respectively snapped into the recessed members 201 to secure the lateral plate 12 to the end plate 13. Alternatively, the elastic protruding member 202s are respectively provided at the two ends of each lateral plate 12, and the recessed members 201 are respectively provided on the opposite sides of the two end plates 13 and are respectively located on the two opposite side surfaces of the partition plate 11.

In addition, the second snapping assembly further includes a spring arm 203. The elastic protruding member 202 is disposed on the end plate 13 through the spring arm 203. When the lateral plates 12 covers the corresponding side of the partition plate 11, the elastic protruding member 202 together with the spring arm 203 are pushed into the end plate 13 by the outer edge of the lateral plate 12. For example, a space is provided at the side of the end plate 13 for the elastic arm 203 to swing elastically. After the elastic protruding member 202 is engaged with the recessed member 201, the elastic protruding member 202 is caught in the recessed member 201 by the elastic recovering action of the spring arm 203.

In one embodiment, the charging connector may include at least one of the first snapping assembly 17, the magnetic assembly 18, the locking assembly 19 and the second snapping assembly 20. For example, the charging connector can be provided with all of the first snapping assembly 17, the magnetic assembly 18, and the locking assembly 19 and the second snapping assembly 20.

Referring to FIGS. 1 and 4, optionally, the charging connector 1 further includes a charging display component 112. The charging display component 112 is arranged on the partition plate 11 for displaying the charging status of the battery 2 by the charging connector 1. For example, the charging display component 112 may be an LED light and is configured to display three colors, such as red, yellow, and green. When the battery 2 is not being charged after the charging connector is powered on, the yellow light stays on. When at least one battery 2 is being charged, the yellow light turns the green light and the green light flashes intermittently. If the charging connector 1 is at fault, the red light stays on. obviously, the display logic of the charging display component can be adjusted as desired. Optionally, a charging display component 112 may be provided for each charging interface 111 to display the charging status of battery 2 by that charging interface 111.

Figure 8:
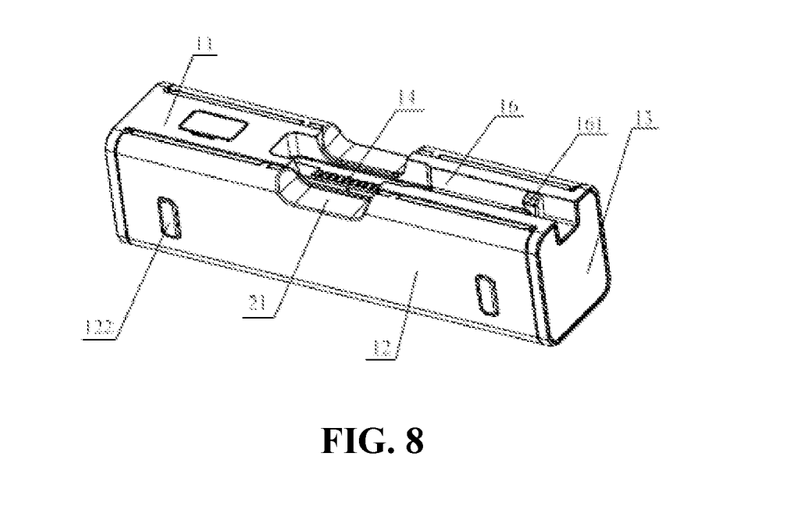
FIG. 8 is a schematic structural diagram of a charging connector according to another example embodiment of the present disclosure.
Figure 9:
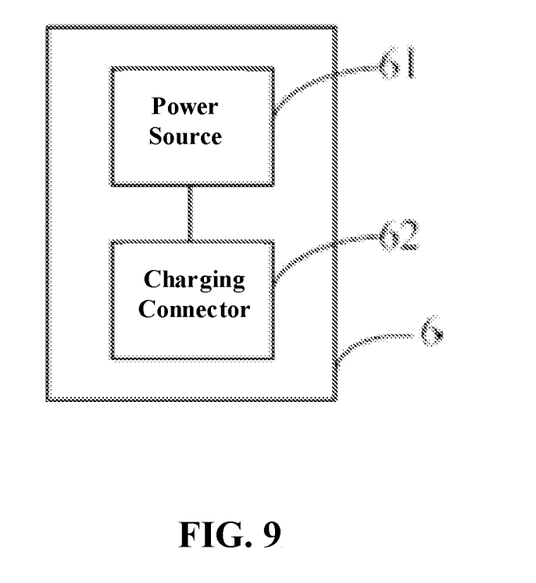
FIG. 9 is a schematic diagram of a charging apparatus according to an example embodiment of the present disclosure.

Referring to FIG. 8, a second embodiment of the charging connector of the present disclosure is provided. Although the charging connector in the second embodiment is substantially similar to the charging connector described above, the power supply interface 14 in this second embodiment is disposed at the bottom of the partition plate 11. Further optionally, the charging connector is further provided with a recessed groove 16. The recessed groove 16 is recessed into the bottom of the partition plate 11, extending along the length of the partition plate 11 and penetrating either one end plate 13 or at least one end plate 13. Obviously, the two end plates 13 can also both be penetrated by the recessed groove 16. The power supply interface 14 is provided on the partition plate 11 in the recessed groove 16. For example, when a charging plug is plugged into the power supply interface 14, the charging plug is accommodated in the recessed groove 16, and the charging plug does not protrude from the bottom surface of the partition plate. Further, the wires connecting the charging plug can pass through the end plate 13 along the extending direction of the recessed groove 16 to connect to a power source.

Optionally, the charging connector further includes a wire clip assembly 161. The wire clip assembly 161 is disposed in the recessed groove 16 and is configured to secure the wires connecting to the power supply interface 14. For example, the wire clip assembly 161 is a half-open arc-shaped collar or includes bumps on both side walls of the recessed groove, such as a spherical bump.

Optionally, the charging connector is further provided with arc-shaped slots 21. The arc-shaped slots 21 are respectively formed at the bottoms of the two lateral plates 12 and are adjacent to the power supply interface 14. The arc-shaped slots 21 penetrate the two lateral plates 12 and connect with the recessed groove 16.

The arc-shaped slots 21 are provided to facilitate the insertion and removal by fingers of the charging plug connected to the power supply interface 14.

In the present embodiments, the bottom of the partition plate 11 refers to a side of the partition plate 11 that is placed on the ground or on a supporting plane when the charging connector is being used. The bottom of the partition plate 11 may also refer to a side of the partition plate 11 that is adjacent the pivot joint portion. Similarly, the bottom of the lateral plate 12 can be designated.

Referring to FIG. 7, an example embodiment of a charging apparatus 6 for charging batteries of an unmanned aerial vehicle is provided. The charging apparatus 6 includes a power source 61 and a charging connector 62 as described in the above embodiments of the charging connector. The charging apparatus 6 may be used to charge batteries of the unmanned aerial vehicle.

The power source 61 can be AC power or DC power, such as external voltage sources, storage batteries, or lithium batteries, etc., which can be connected through a cable to the power supply interface of the charging connector 62.

In summary, a charging connector and charging apparatus are provided in the present disclosure. The charging interfaces 111 are arranged on the partition plate 11, and the two lateral plates 12 are respectively pivotally connected to the two opposite side surfaces of the partition plate 11. The lateral plates 12 are configured to rotate with respect to the partition plate 11 whereby the charging connector can be in an open state when charging a battery and in a folded state when not charging a battery. This can effectively reduce the size of the charging connector and allow a more compact structure of the charging connector. The charging connect is also easy to carry. The charging connector and charging apparatus of the present disclosure are able to cure deficiencies associated with the existing flat panel chargers, such as taking up a large space and being inconvenient to carry and store.

Compared to the existing technologies, the present disclosure provides the following advantages: the charging interfaces are arranged on the partition plate. The two lateral plates are each pivotally connected to one corresponding side surface of the two opposite side surfaces of the partition plate. The lateral plates can be respectively rotated with respect to the partition plate whereby the charging connector is configured to be in an open state when charging a battery and in a folded state when not charging the battery. This can effectively reduce the size of the charging connector and allow a compact structure of the charging connector. The charging connector is also easy to carry.

The above are only examples of the present disclosure, and thus do not limit the patent scope of the present disclosure. Any equivalent structure modifications or equivalent process transformations made by using the description and drawings of the present disclosure, or directly or indirectly used in other related technical fields, are similarly included in the protection scope of the present disclosure.

What is claimed is:

1. A charging connector, comprising:
   a partition plate including at least one charging interface provided on each side surface of two opposite side surfaces of the partition plate, wherein the at least one charging interface is electrically coupled to a charging interface of a battery to charge the battery; and
   two lateral plates respectively pivotally connected to the two opposite side surfaces of the partition plate and respectively rotatable with respect to the partition plate, wherein outer edges of the two lateral plates, which are away from a pivot joint portion, are configured to move away from or close to the partition plate to expose or cover the two opposite side surfaces of the partition plate to enable the charging connector to be in an open state or a folded state correspondingly,
   wherein, when the battery being charged by the charging connector, at least one lateral plate of the two lateral plates is rotated with respect to the partition plate, whereby an outer edge of the at least one lateral plate is away from the partition plate to expose the at least one charging interface on at least one side surface of the two opposite side surfaces of the partition plate, to allow the exposed at least one charging interface to charge the battery.

2. The charging connector according to claim 1, further comprising:
   two end plates respectively disposed at two ends of the partition plate, wherein a width of the two end plates is greater than a width of the two ends of the partition plate, whereby when the two lateral plates cover the partition plate, receiving spaces are formed between the two lateral plates, the partition plate and the two end plates to accommodate the at least one charging interface provided on each side surface of the two opposite side surfaces of the partition plate.

3. The charging connector according to claim 2, further comprising:
   a power supply interface provided at a bottom of one end plate of the two end plates or the partition plate, wherein the power supply interface is configured to be electrically coupled to an external power source and to the at least one charging interface on each side surface of the two opposite side surfaces of the partition plate, whereby the charging connector is enabled to charge the battery through the exposed at least one charging interface.

4. The charging connector according to claim 3, further comprising:
   a charging circuit disposed in a plate body of the partition plate, wherein the power supply interface is through the charging circuit electrically coupled to the at least one charging interface provided on each side surface of the two opposite side surfaces of the partition plate; and/or
   a recessed groove recessed into the bottom of the partition plate, extending along a length direction of the partition plate and penetrating either one of the two end plates, wherein the power supply interface is arranged on the partition plate inside the recessed groove.

5. The charging connector according to claim 4, further comprising:
   an arc-shaped slot formed at a bottom of the two lateral plates and being adjacent to the power supply interface, wherein the arc-shaped slot runs through the two lateral plates and is connected with the recessed groove.

6. The charging connector according to claim 1, wherein each side surface of the two opposite side surfaces of the partition plate is provided with a plurality of charging interfaces, wherein the plurality of charging interfaces on each side surface of the two opposite side surfaces of the partition plate are arranged side by side at intervals along a length direction of the partition plate.

7. The charging connector according to claim 6, wherein:
   the plurality of charging interfaces on one side surface of the two opposite side surfaces of the partition plate are respectively arranged symmetrically or alternately with respect to the plurality of charging interfaces on the other side surface of the two opposite side surfaces of the partition plate; and/or
   each of the charging interfaces includes a plurality of parallelly arranged electrode sheets and an electrode ring member,
   wherein:
      the electrode ring member is provided protruding from one side surface of the two opposite side surfaces of the partition plate,
      the plurality of parallelly arranged electrode sheets are provided on the one side surface of the two opposite side surfaces of the partition plate encompassed by the electrode ring member,
      when charging the battery, the charging interface of the battery is inserted into the electrode ring member and is in contact with the plurality of parallelly arranged electrode sheets, and
      a recess is provided for each of the charging interfaces on the two lateral plate, and when the two lateral plates cover the partition plate, the electrode ring member and the plurality of parallelly arranged electrode sheets of each of the charging interfaces are received in the recess.

8. The charging connector according to claim 2, further comprising:
   at least one securing assembly, wherein the at least one securing assembly is configured to secure at least one of the two lateral plates to the partition plate when the at least one lateral plate is closed.

9. The charging connector according to claim 8, wherein:
   the at least one securing assembly is a magnetic assembly including a first magnetic member and a second magnetic member, wherein the first magnetic member is disposed on the partition plate, the second magnetic member is disposed on one corresponding lateral plate of the two lateral plates, and when the one corresponding lateral plate is closed, the first magnetic member and the second magnetic member are attracted to each other to secure the one corresponding lateral plate to the partition plate; and/or
   the at least one securing assembly is a first snapping assembly including a snap member and a snap slot, wherein the snap recess is recessed on a side surface of the partition plate or of one lateral plate of the two lateral plates, the snap member is protrudingly provided on a side surface of the one lateral plate of the two lateral plate or of the partition plate correspondingly lateral plate, and when the lateral plate is closed, the snap member is snapped into the snap slot to secure the lateral plate to the partition plate; and/or the at least one securing assembly is a second snapping assembly including a recess member and an elastic protruding member, wherein the recess member is provided at two ends of the lateral plate, the elastic protruding member is disposed correspondingly at opposite sides of the two end plates, and when the lateral plate is closed, the elastic protruding member engages the recess member to secure the lateral plate to the end plates.

10. A charging apparatus for charging a battery of an unmanned aerial vehicle, comprising:

a charging connector, comprising:

a partition plate including at least one charging interface provided on each side surface of two opposite side surfaces of the partition plate, wherein the at least one charging interface is electrically coupled to a charging interface of a battery to charge the battery; and two lateral plates respectively pivotally connected to the two opposite side surfaces of the partition plate and respectively rotatable with respect to the partition plate, wherein outer edges of the two lateral plates, which are away from a pivot joint portion, are configured to move away from or close to the partition plate to expose or cover the two opposite side surfaces of the partition plate to enable the charging connector to be in an open state or a folded state correspondingly, wherein, when the battery being charged by the charging connector, at least one lateral plate of the two lateral plates is rotated with respect to the partition plate, whereby an outer edge of the at least one lateral plate is away from the partition plate to expose the at least one charging interface on at least one side surface of the two opposite side surfaces of the partition plate, to allow the exposed at least one charging interface to charge the battery.

11. The charging apparatus according to claim 10, further comprising:

two end plates respectively disposed at two ends of the partition plate, wherein a width of the two end plates is greater than a width of the two ends of the partition plate, whereby when the two lateral plates cover the partition plate, receiving spaces are formed between the two lateral plates, the partition plate and the two end plates to accommodate the at least one charging interface provided on each side surface of the two opposite side surfaces of the partition plate.

12. The charging apparatus according to claim 11, further comprising:

a power supply interface provided at a bottom of one end plate of the two end plates or the partition plate, wherein the power supply interface is configured to be electrically coupled to an external power source and to the at least one charging interface on each side surface of the two opposite side surfaces of the partition plate, whereby the charging connector is enabled to charge the battery through the exposed at least one charging interface.

13. The charging apparatus according to claim 12, further comprising:

a charging circuit disposed in a plate body of the partition plate, wherein the power supply interface is through the charging circuit electrically coupled to the at least one charging interface provided on each side surface of the two opposite side surfaces of the partition plate; and/or a recessed groove recessed into the bottom of the partition plate, extending along a length direction of the partition plate and penetrating either one of the two end plates, wherein the power supply interface is arranged on the partition plate inside the recessed groove.

14. The charging apparatus according to claim 13, further comprising:

an arc-shaped slot formed at a bottom of the two lateral plates and being adjacent to the power supply interface, wherein the arc-shaped slot runs through the two lateral plates and is connected with the recessed groove.

15. The charging apparatus according to claim 10, wherein each side surface of the two opposite side surfaces of the partition plate is provided with a plurality of charging interfaces, wherein the plurality of charging interfaces on each side surface of the two opposite side surfaces of the partition plate are arranged side by side at intervals along a length direction of the partition plate.

16. The charging apparatus according to claim 15, wherein:

the plurality of charging interfaces on one side surface of the two opposite side surfaces of the partition plate are respectively arranged symmetrically or alternately with respect to the plurality of charging interfaces on the other side surface of the two opposite side surfaces of the partition plate; and/or each of the charging interfaces includes a plurality of parallelly arranged electrode sheets and an electrode ring member, wherein:

the electrode ring member is provided protruding from one side surface of the two opposite side surfaces of the partition plate, the plurality of parallelly arranged electrode sheets are provided on the one side surface of the two opposite side surfaces of the partition plate encompassed by the electrode ring member, when charging the battery, the charging interface of the battery is inserted into the electrode ring member and is in contact with the plurality of parallelly arranged electrode sheets, and a recess is provided for each of the charging interfaces on the two lateral plate, and when the two lateral plates cover the partition plate, the electrode ring member and the plurality of parallelly arranged electrode sheets of each of the charging interfaces are received in the recess.

17. The charging apparatus according to claim 11, further comprising:

at least one securing assembly, wherein the at least one securing assembly is configured to secure at least one of the two lateral plates to the partition plate when the at least one lateral plate is closed.

18. The charging apparatus according to claim 17, wherein:

the at least one securing assembly is a magnetic assembly including a first magnetic member and a second magnetic member, wherein the first magnetic member is disposed on the partition plate, the second magnetic member is disposed on one corresponding lateral plate of the two lateral plates, and when the one corresponding lateral plate is closed, the first magnetic member and the second magnetic member are attracted to each other to secure the one corresponding lateral plate to the partition plate; and/or the at least one securing assembly is a first snapping assembly including a snap member and a snap slot, wherein the snap recess is recessed on a side surface of the partition plate or of one lateral plate of the two lateral plates, the snap member is protrudingly provided on a side surface of the one lateral plate of the two lateral plate or of the partition plate correspondingly lateral plate, and when the lateral plate is closed, the snap member is snapped into the snap slot to secure the lateral plate to the partition plate; and/or the at least one securing assembly is a second snapping assembly including a recess member and an elastic protruding member, wherein the recess member is provided at two ends of the lateral plate, the elastic protruding member is disposed correspondingly at opposite sides of the two end plates, and when the lateral plate is closed, the elastic protruding member engages the recess member to secure the lateral plate to the end plates.

\* \* \* \* \*